United States Patent [19]

Fox

[11] Patent Number: 5,449,208

[45] Date of Patent: Sep. 12, 1995

[54] TRACK SWITCH SNOW MELTER DUCT CONNECTION SYSTEM

[75] Inventor: David K. Fox, Wayzata, Minn.

[73] Assignee: Railway Equipment Company, Inc., Delano, Minn.

[21] Appl. No.: 159,430

[22] Filed: Nov. 29, 1993

[51] Int. Cl.[6] .................. F16L 19/02; F16L 35/00
[52] U.S. Cl. .................... 285/325; 285/405; 285/863; 285/424
[58] Field of Search ............ 285/39, 325, 405, 424, 285/363, 406

[56] References Cited

U.S. PATENT DOCUMENTS

| | | | |
|---|---|---|---|
| 323,317 | 7/1885 | Goodrich et al. | |
| 2,221,854 | 11/1940 | Zalkind | 285/424 X |
| 2,338,191 | 1/1944 | Lumm | 285/424 X |
| 3,463,518 | 8/1968 | Broussard et al. | |
| 3,583,731 | 6/1971 | Jewell | |
| 3,941,409 | 3/1976 | Rameau | |
| 4,040,449 | 8/1977 | Butler et al. | 285/363 X |
| 4,466,641 | 8/1984 | Heilman et al. | 285/424 X |
| 4,995,648 | 2/1991 | Jackson | 285/424 X |
| 5,188,399 | 2/1993 | Durina | |
| 5,275,449 | 1/1994 | Hunter | 285/424 |
| 5,333,912 | 8/1994 | Fox | 285/39 |

FOREIGN PATENT DOCUMENTS 9008288  7/1990  WIPO.

OTHER PUBLICATIONS

Brochure entitled "Model 933 Magnum ™ Hot Air Blower Track Switch Snow Melter System" by Railway Equipment Co., published on a date prior to Apr. 1992.

Primary Examiner—Randolph A. Reese
Assistant Examiner—Heather Chun Shackelford
Attorney, Agent, or Firm—Merchant, Gould, Smith, Edell, Welter & Schmidt

[57] ABSTRACT

A track switch snow melter duct connection system including end flanges with a top portion, each end flange being attached to a distal end portion on a duct which is to be connected such that the top portion extends outward and above the distal end portion. Side flanges are also attached to each duct and extend outward such that a gap exists between the distal end portion of each duct and the side flange. The connection system also includes an attachment mechanism for attaching the top portion of end flanges on adjacent ducts and a connecting member which can be slidably inserted between adjacent ducts having an elongate channel shape formed by a base and two side legs and two extensions extending from and attached to the distal end of the two side legs. The connecting member has a width such that two connected end flanges can be positioned between the two side legs and such that the extensions are positioned in the gap between the side flanges and distal end portion of each duct.

21 Claims, 5 Drawing Sheets

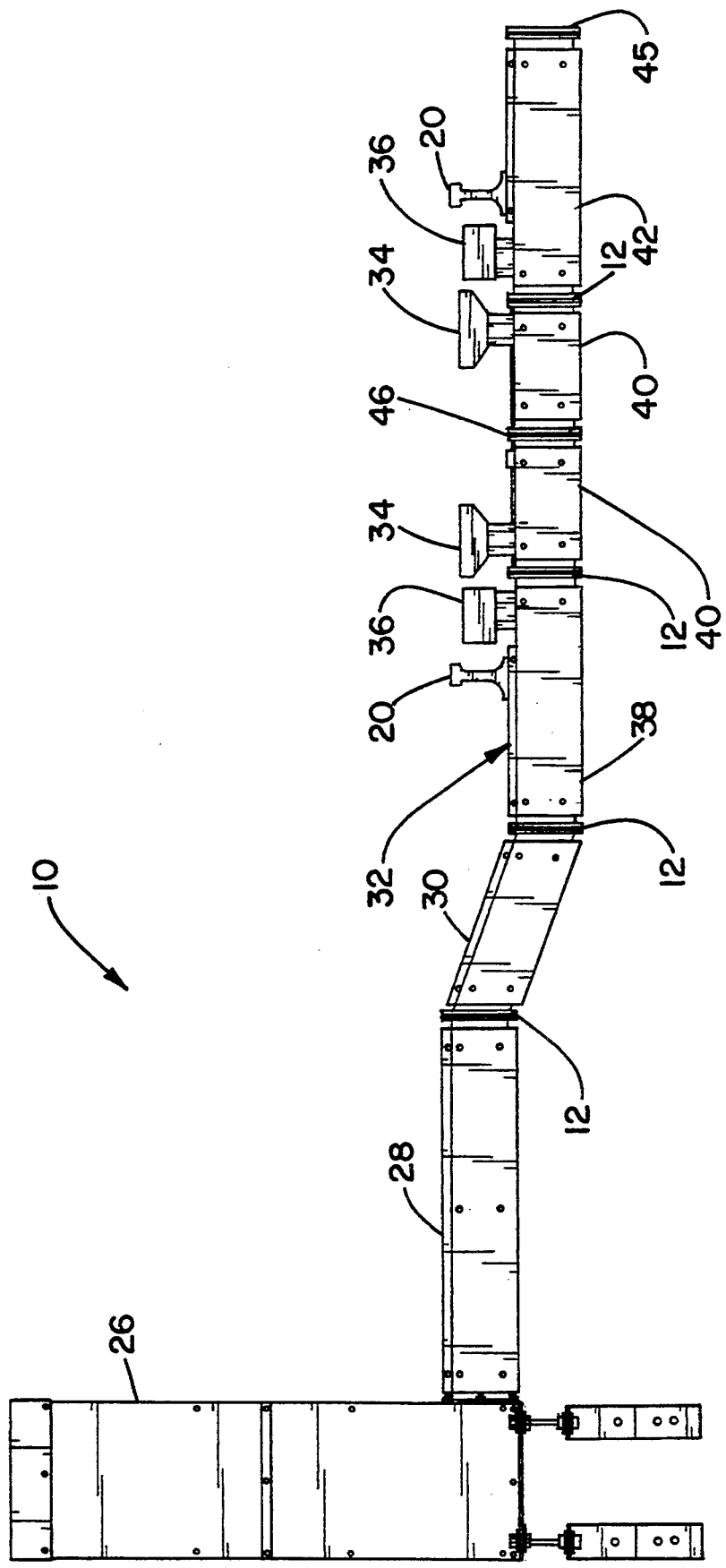

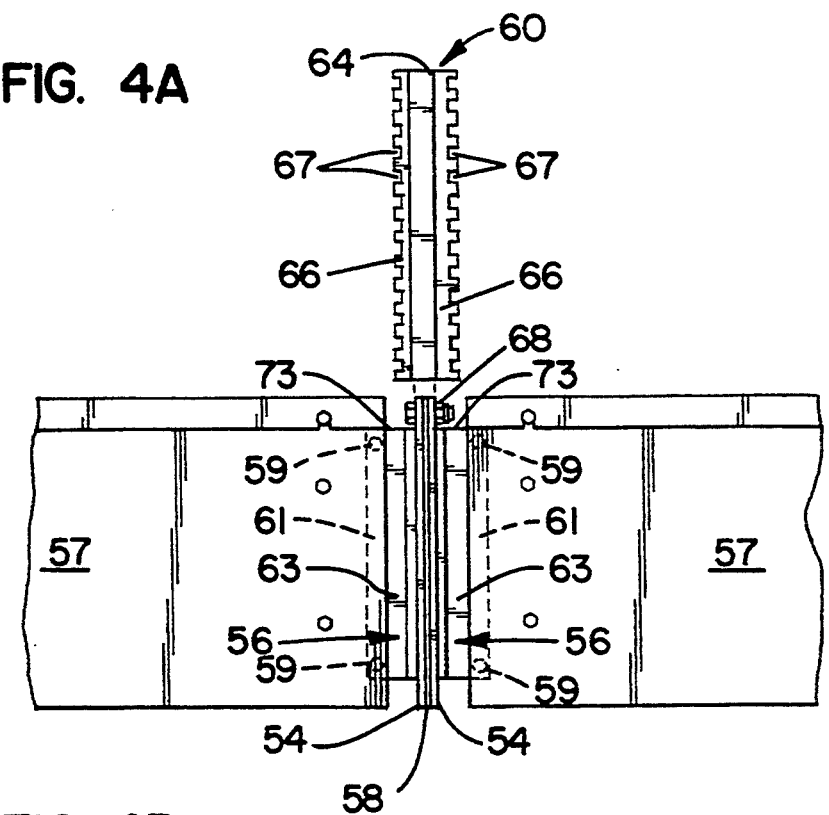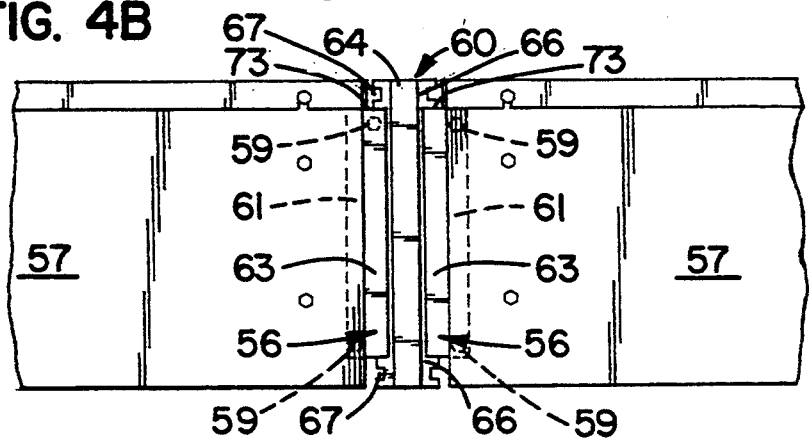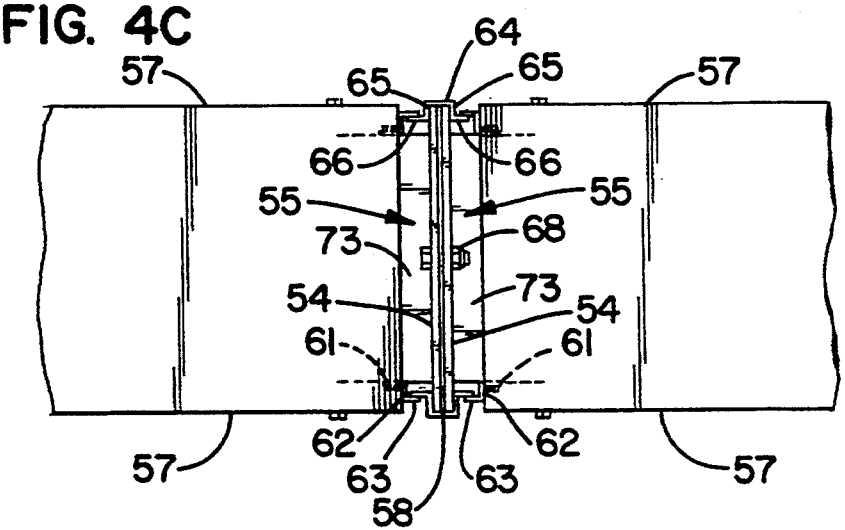

TRACK SWITCH SNOW MELTER DUCT CONNECTION SYSTEM

BACKGROUND OF THE INVENTION

1. Technical Field of the Invention

This invention relates to hot air blower-type track switch snow melters, and more particularly to a connection system for connecting track switch snow melter ducts for use in blower-type track switch snow melters.

2. Description of the Prior Art

Hot air blower-type track switch snow melters have become standard equipment for railroads operating in cold climates. For those railroads, snow and ice build-up at track switches is a problem and track switch snow melters have become the solution of choice. With track switch snow melters, rather than laboriously clearing switches of snow by hand, the task can be done automatically.

Track switch snow melters generally have a plurality of snow sensors that detect the presence of snow in switching areas. These sensors relay a signal to a control panel on a heat source or blower unit. When snow is detected, hot air is blown through a system of ducts which direct a stream of hot air through various nozzles and outlets to critical areas of the switch which must be kept free of snow and ice.

The placement of the ductwork is a difficult and critical aspect of the installation of hot air blowers. The ducts must be both proximate to the rails so that the hot air can melt the snow and ice around them and at the same time not obstruct passing trains. One arrangement that has been used to accomplish these dual objectives is to place a first duct running from the heat source parallel to and between two ties and beneath the rails of the track. From the first duct, low profile nozzles are extended to direct hot air at critical parts of the switching mechanism. In addition to the nozzles, additional ducts are extended from the first duct perpendicular to the ties and parallel to the rails. These ducts are attached to the top of the ties by straps that extend over the ducts and that are bolted to the ties. Openings along the side of these ducts direct hot air to areas to be kept clear of snow and ice.

Although track switch snow melters have been an important labor-saving device for keeping track switches clear of snow and ice, the ductwork must be removed whenever the track is to be routinely maintained. Unfortunately, with currently-used configurations of the ductwork, this is a time-consuming process. In particular, the first duct must be pulled out from between the ties in a single segment. Considerable effort is required to slide the first duct out because the first duct is approximately as long as the ties, making it very cumbersome. In addition, friction is created between the sides of the first duct and the ballast. Moreover, flanges protruding from the first duct can engage the ballast, adding to the difficulty of removing the first duct.

Therefore, there arises a need for a track switch snow melter which has ducts which can be easily connected and disconnected to allow for the easy removal of the duct segments during track maintenance.

SUMMARY OF THE INVENTION

The present invention is for a track switch snow melter duct connection system having a pair of end flanges with a top portion, one end flange being attached to a distal end portion of each duct which is to be connected such that the top portion extends outward and above the top surface of each distal end portion. A plurality of side flanges are also attached to each duct such that the side flanges extend outward forming a gap between the distal end portion and the side flange. An attachment mechanism is also provided for attaching the top portion of the end flanges on the ducts which are to be connected. The connection system also includes a connecting member, which can be slidable inserted between attached adjacent ducts, having an elongate channel shape formed by a base and two sides and two extensions attached to the distal end of the two sides. The connecting member would be arranged and configured such that two attached end flanges could be positioned between the two sides while the extensions would be positioned in the gap between the distal end portions and the side flange.

Adjacent track switch snow melter ducts would be connected by attaching end flanges to a distal end portion of each duct such that the top portion of the end flanges extended above the top surface of the ducts and attaching side flanges to each duct such that the side flanges extended outward forming a gap between the distal end portion and the side flange. The top portion of end flanges on adjacent ducts would be attached together by a fastening mechanism. The connecting member would then be slid between the two ducts such that a portion of the end flanges are between the two sides of the connecting member and the extensions are in the gap between the duct end portion and the side flanges.

The present invention meets the need for a track switch snow melter duct which is easily connected and disconnected by providing a secure, simple and accessible duct connection system for use with these ducts. Once end flanges and side flanges have been attached to the ducts, which could be done as part of the manufacturing of the ducts, the ducts are easily attached by a fastening means which is located at an easily accessible location, above the distal end portion of the ducts. The connecting members are then slid into position completing the assembly. Because both the fastening means and connecting members are in easily accessible locations, the disconnection of the ducts can also be done quickly. Therefore, current duct assemblies, which must be removed as single pieces because they are too difficult to disconnect when positioned under a track, can be easily detached and lifted out as individual pieces.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views:

FIG. 3 is a partial side plan view of a hot air blower-type track switch snow melter;

FIG. 4a is a partial side plan view of one embodiment of the track switch snow melter duct connection system;

FIG. 4b is the embodiment of the track switch embodiment of the track switch snow melter connection system as shown in FIG. 4a with the connecting member positioned between the two ducts;

FIG. 4c is a top plan view of FIG. 4b;

FIG. 5b is an end plan view of FIG. 5a;

DETAILED DESCRIPTION OF THE PREFERRED EMBODIMENT

Figure 2:
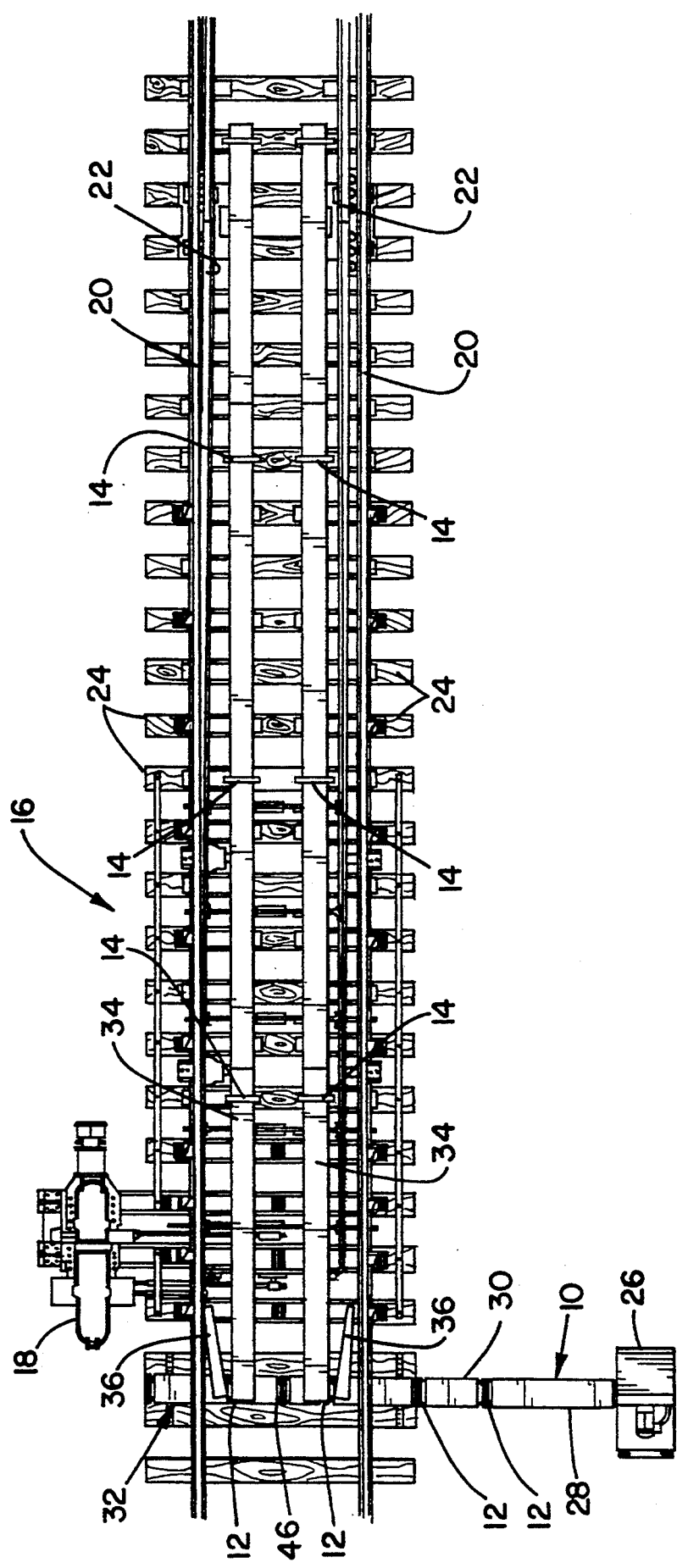
FIG. 2 is a top plan view of a hot air blower-type track switch snow melter as positioned on a railway track switch.

Referring now to the drawings, wherein like reference numerals designate identical or corresponding parts throughout the views, and referring in particular to FIG. 2, referred to generally as 16 is a railway track switch. Shown in FIG. 2 is a hot air blower-type track switch snow melter, generally referred to as 10, incorporating a plurality duct connection systems 12 and track duct support brackets 14.

The switch includes an actuator 18, two stationary rails 20 and two slidably-mounted rails, referred to as switching points 22. The stationary rails 20 are held in place by a plurality of ties 24. The ties 24 are generally embedded in and supported by crushed aggregate bed or ballast (not shown). As well-known to those skilled in the art, the switching points 22 can be slid horizontally so that one of the switching points 22 or the other is engaged with the proximate stationary rail 20 in order to direct a passing train onto one of two tracks.

Hot air blower 10 includes a main blower unit 26. The main blower unit 26 can be either gas-fired or have an electric heating element. Leading from the main blower unit 26 is a flame duct 28 which leads to an offset duct 30 and then to an outlet duct 32. Mounted to the outlet duct 32 are two track ducts 34 and two point nozzles 36.

FIG. 3 shows a partial side plan view of hot air blower 10. Four duct connection systems 12 in accordance with the present invention are also shown. From left-to-right, as shown in FIG. 3, the first of the duct connection systems 12 connects the flame duct 28 to the offset duct 30. The next connection system 12 connects the offset duct 30 with the outlet duct 32. The outlet duct 32 is preferably in three sections. From left-to-right, these sections are a first section 38, a center section 40 and an end section 42. A plate 45 seals the distal end of end section 42. Duct 32 is held in position by a plurality of straps (not shown) fastened to the ties 24.

Extending from the first section 38 of the outlet duct 32 is one point nozzle 36. The other point nozzle 36 extends from end section 42. Extending from the center section 40, in the preferred embodiment, are two track ducts 34. Track ducts 34 have side ports (not shown) for directing hot air at the track switch.

FIG. 3 also shows the relative position of the outlet duct 32 and stationary rails 20. Outlet duct 32 is installed parallel to ties 24 and just beneath stationary rails 20. Ducts 28, 30 and 32 are preferably steel. In order to insure that duct 32 does not create an electrical connection between rails 20, an electrically-insulating joint 46 must be placed between oppositely-disposed rails 20. Insulating joint 46 is preferably placed in center section 40 of outlet duct 32.

Figure 1:
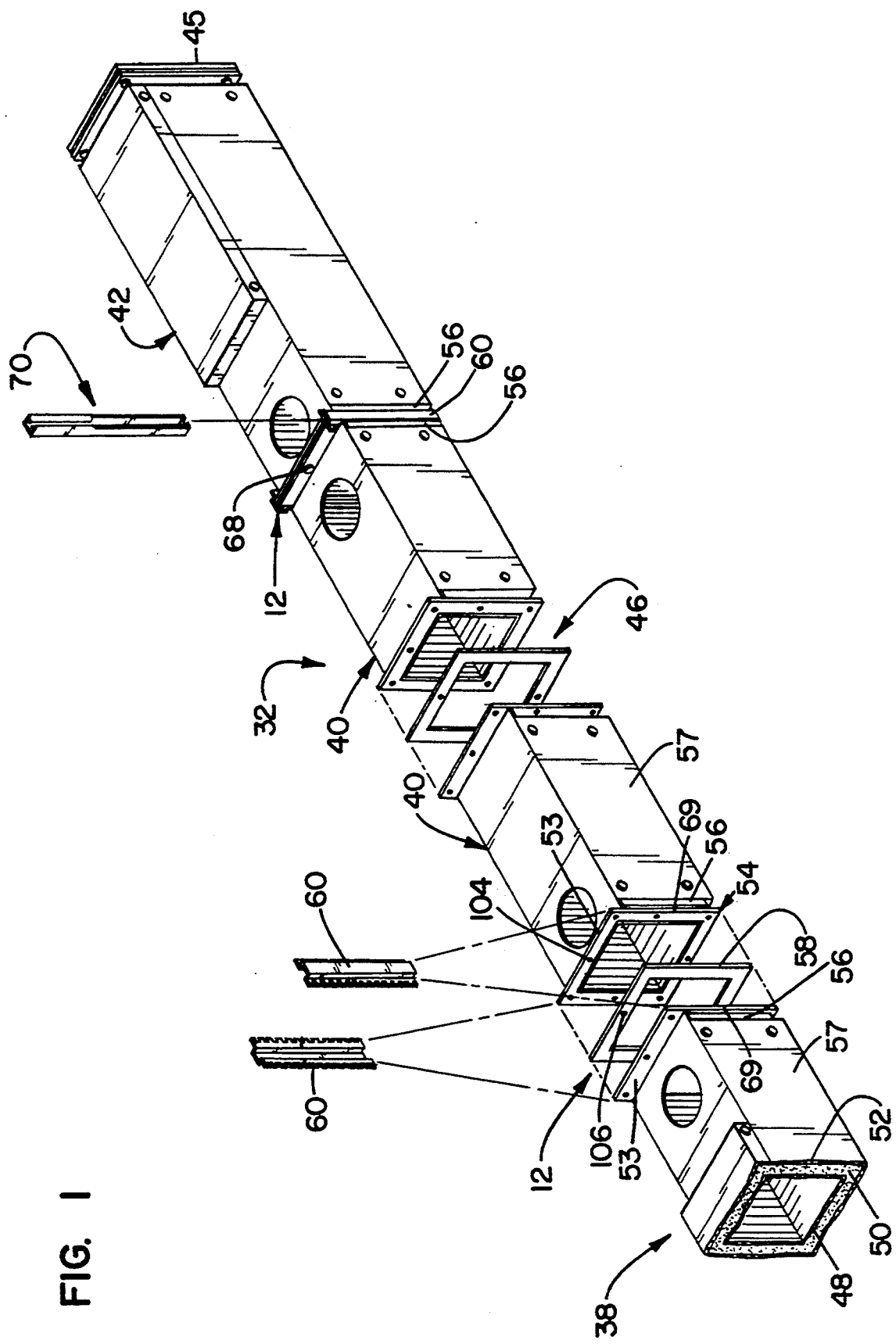
FIG. 1 is an exploded view of the preferred embodiment of the track switch snow melter duct connection system for use with hot air blower-type track switch snow melter ducts.

FIG. 1 shows a partial and expanded view of outlet duct 32. First section 38 has a duct connection system 12 disposed at one end. The opposite end of first duct section 38 is cut away to reveal the cross section of first duct section 38. A cross section of first duct section 38 of outlet duct 32 as shown in FIG. 1, includes a duct liner 48, a duct insulation layer 50 and duct housing 52. Duct liner 48 and duct housing 52 may be steel, galvanized steel, or any other comparable material. Duct insulation layer 50 is preferably fiberglass. In the preferred embodiment, flame duct 28, offset duct 30, first section 38 of outlet duct 32 and end section 42 of outlet duct 32 are insulated in this manner. Center section 40 of outlet duct 32 is preferably not insulated, however, center section 42 may be insulated without departing from the principles of the present invention. Center section 40 is also preferably in two pieces with insulating joint 46 placed therebetween.

As shown in FIGS. 1 and 4, the duct connection system 12 includes end flanges 54 attached to distal end portions 55 of each duct (best shown in FIG. 4c), side flanges 56 attached to the side walls 57 of each duct, a gasket 58 and two connecting members 60. End flanges 54 are preferably attached to respective duct end portions 55 by welding and with threaded fasteners (not shown) and have a top portion 53 that extends above the top surface 73 of the distal end portion 55. In the preferred embodiment, end flanges 54 are generally rectangular members made of steel.

Gasket 58 is affixed between end flanges 54. Gasket 58 is preferably made of ¼" thick highly elastic silicon. Gasket 58 is compressed approximately 50% of its ¼" thickness at approximately 7 p.s.i. The gasket 58 also preferably has an adhesive backing on one end for easy attachment to an end flange 54 and provides an air-tight seal between end flanges 54 when compressed.

As best shown in FIGS. 4a–4c, side flanges 56 preferably are elongate members having a first leg 61, second leg 62 and third leg 63. First leg 61 is attached to the inner surface of the duct housing 52 of a respective duct side wall 57 by threaded fasteners 59. Second leg 62 extends outward from the first leg 61 at the distal end of the side wall 57. Third leg 63 extends outward from the distal end of the side wall 57, perpendicular to the second leg 62 such that a gap is formed between the third leg 63 and the distal end portions 55 of the ducts.

Connecting members 60 preferably have an elongate channel shape formed by a base 64 and two side legs 65. Extension 66 extends outward from the distal end of the two side legs 65 and preferably has a plurality of notches 67 therein. Connecting members 60 and side flanges 56 are preferably made of steel.

When connecting adjacent ducts, the top portion 53 of adjacent end flanges 54 and gasket 58 are connected together. In the preferred embodiment, the top portion 53 of adjacent end flanges 54 are connected together by use of a bolt 68 that is inserted into fastening apertures 104 which are located in the top portion 53 of end flanges 54 and aperture 106 located in gasket 58, best shown in FIG. 1. The bolt 68 is then tightened such that the end flanges 54 compress the gasket 58.

After the top portions 53 of the end flanges 54 have been secured, a connecting member 60 is positioned above and between the adjacent ducts such that side surfaces 69 of the end flanges 54 positioned between the two side legs 65 of the connecting member 60 and the extensions 66 are positioned above the gap between the third leg 63 of the side flange 56 and the distal end portions 55 of the ducts, best shown in FIG. 4a. The connecting member 60 is then slid downward until the connecting member 60 is completely positioned between the ducts having the side surfaces 69 of the end flanges 54 located between the two side legs 65 of the connecting member 60 and the extensions 66 located between the third leg 63 of the side flanges 56 and distal end portions 55, best shown in FIGS. 4b and 4c.

During use, the duct work of the hot air blower 10 can be quickly removed from the railway when track maintenance is conducted by using the quick release duct connection system 12 of the preferred embodiment. This is done by first removing the track ducts 34 by unfastening the track duct support brackets 14. Finally, offset duct 30 and outlet duct 32 can be removed. To remove ducts 30 and 32, the duct connection systems 12 are detached between the flame duct 28 and offset duct 30, offset duct and first section 38, first section 38 and center section 40, and center section 40 and end section 42 as described below. Offset duct 30 and center section 40 are then lifted out. Then first section 38 and end section 42 may be slid inwardly or outwardly from beneath respective proximate rails 20 to complete the disassembly.

To detach connection systems 12, the connecting members 60 are slid upwardly and out from between the adjacent ducts. The bolt 68 can then be unfastened and removed from the fastening apertures 104 in the end flanges 54 and the gasket aperture 106. The adjacent ducts are then easily removed as described above.

Figure 5B:
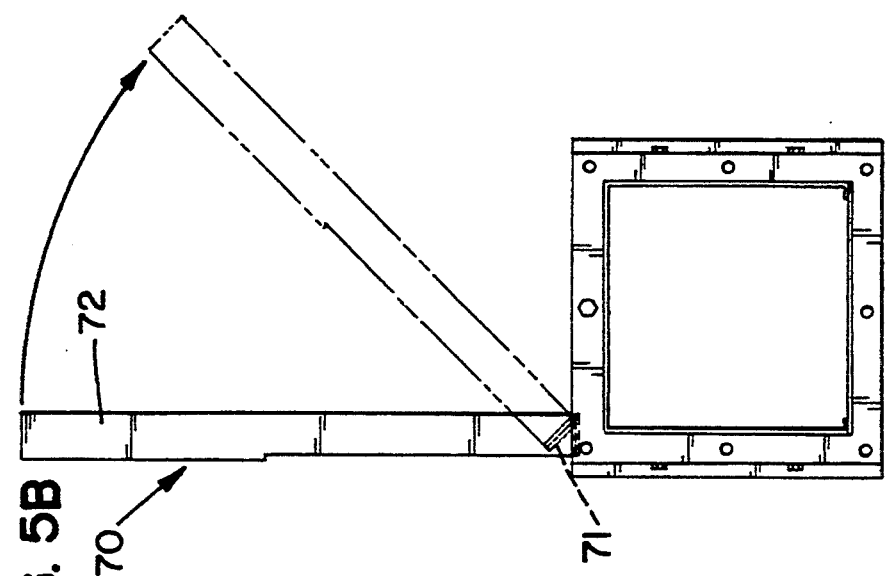
Figure 5C:
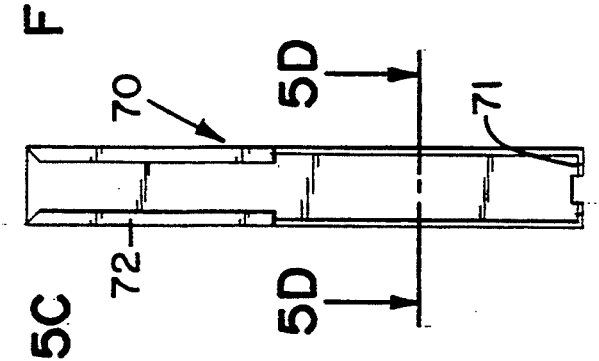
FIG. 5c is a side plan view of the preferred embodiment of the clamping wrench.
Figure 5D:
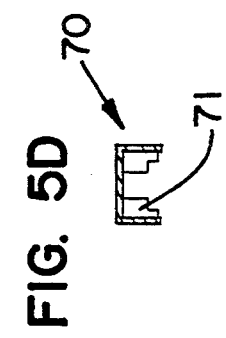
FIG. 5d is a cross-sectional view of FIG. 5c as shown along section 5d–5d.
Figure 5A:
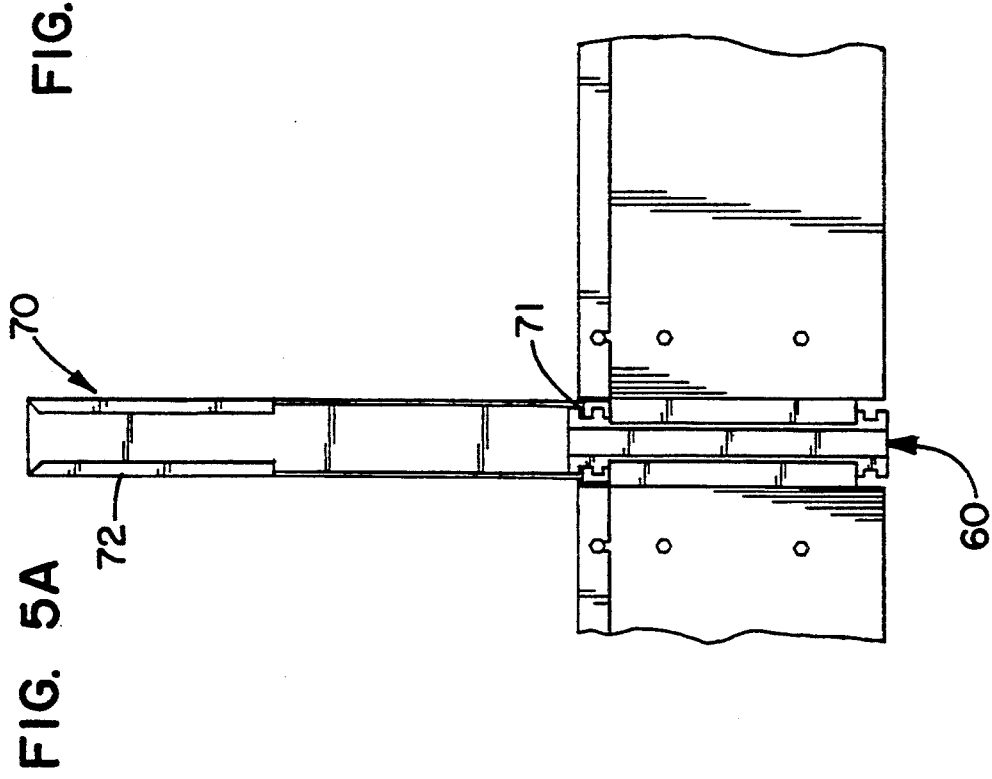
FIG. 5a is a partial side plan view of the connection system as shown in FIGS. 4a–4c with a clamping wrench for removing the connecting member.

However, in the preferred embodiment, the duct connection system 12 also includes a clamp wrench 70 for easily removing the connecting members 60 from between the adjacent ducts. As shown in FIGS. 5c–5d, the preferred embodiment of the clamp wrench 70 has an elongate channel shape with a handle portion 72 and a notched end portion 71 which would be arranged and configured to engage the notches 67 in the extension 66 as shown in FIG. 5a. After the notched end portion 71 engages notches 67, the handle portion 72 of the clamp wrench 70 is rotated away from the connecting member 60 and downward such that the notched end portion 71 raises the connecting member 60 as shown in FIG. 5b. The notched end portion 71 is then re-engaged in a new set of notches 67 in the extension 66 and the handle portion 72 is rotated as described previously. This procedure is repeated until the connecting member 60 is completely removed from between adjacent ducts or until the connecting member 60 can be easily removed by hand. Those skilled in the art recognize that other means for removing the connecting members could be used with the present invention.

Although characteristics and advantages, together with details of structure, function and process steps, have been described in reference to the preferred embodiment herein, it is understood that the disclosure is illustrative. To that degree, various changes made, especially in matters of shape, size and arrangement, to the full extent extended by the general meaning of the terms in which the appended claims are expressed, are within the principle of the present invention.

What is claimed is:

1. A track switch snow melter duct connection system comprising:
   a) duct sections having end flanges,
   b) each of said duct sections having an axial end and each duct section further having a side flange located proximate the axial end of the duct section, the side flanges extending axially outward from the axial ends of the duct sections such that radial gaps are formed between the duct sections and the side flanges proximate the axial ends of the duct sections; and
   c) a connecting member, which is slidably inserted over adjacent duct section end flanges, having an elongated channel shape formed by a base and two spaced apart side legs and two extensions attached to the side legs, the connecting member being arranged and configured such that two connected end flanges can be positioned between the two side legs while the extensions are positioned in the radial gaps between the duct sections and the side flanges.

2. A track switch snow melter duct connection system according to claim 1, wherein the end flanges have top portions that work in combination with an attaching assembly for attaching adjacent end flanges.

3. A track switch snow melter duct connection system according to claim 2, wherein the attaching assembly for attaching adjacent end flanges includes a fastener that is arranged and configured to be inserted through an aperture located in the top portion of each end flange.

4. A track switch snow melter duct connection system according to claim 1, wherein the duct sections have side walls having distal ends and the side flanges include first leg portions that are arranged and configured to be attached to the side walls of the duct sections, second leg portions which are perpendicular to the first leg portions and extend radially outward from the side walls of the duct sections, and third leg portions which are parallel to the first leg portions and perpendicular to the second leg portions and extend axially outward from the distal ends of the side walls.

5. A track switch snow melter duct connection system according to claim 1, wherein the connecting member includes a plurality of notches.

6. A track switch snow melter duct connection system according to claim 5, further comprising a wrench for removing the connecting member having means for engaging the notches in the extensions.

7. A track switch snow melter duct connection system according to claim 6, wherein the wrench comprises an elongate channel member with a handle portion and a notched end portion, the notched end portion being arranged and configured to be insertable into the notches of the connecting member extensions.

8. A track switch snow melter duct connection system according to claim 1, further comprising sealing means for providing an airtight seal between end flanges of adjacent duct sections.

9. A track switch snow melter duct connection system according to claim 8, wherein the sealing means includes a gasket that is arranged and configured for insertion between two of the end flanges.

10. A track switch snow melter duct connection system according to claim 1, wherein the extensions form generally right angles with respect to the side legs of the connecting member.

11. A track switch snow melter duct connection system comprising:
   a) end flanges each having a top portion and side surfaces; a pair of connected ducts each having axial end portions and side walls, wherein the end flanges are attached to the axial end portions such that the top portions extend radially outward from the end portions;
   b) sealing means for providing an air-tight seal between adjacent ducts;
   c) means for attaching the end flanges at the top portion of each end flange such that the sealing means is between the end flanges;
   d) side flanges having first portions attached to the side walls of the ducts, second portions extending radially outward from the ducts, and third portions extending axially outward from the side walls of the ducts that are substantially parallel to the first portions and substantially perpendicular to the second portions; and
   e) a connecting member having an elongate channel portion with a base and two side legs, and extensions having a plurality of notches therein, the extensions being attached to the two side legs, the connecting member being arranged and configured such that the connecting member can be slid over the end flanges such that the side surfaces of the end flanges are located between the two side legs and the extensions are located between the third portions of the side flanges and the duct end portions.

12. A track switch snow melter duct connection system according to claim 11, wherein the sealing means includes a gasket that is sized to fit between two end flanges on adjacent ducts.

13. A track switch snow melter duct connection system according to claim 11, wherein the means for attaching the end flanges includes a fastener which is arranged and configured to be inserted through apertures located in the top portion of the end flanges.

14. A track switch snow melter duct connection system according to claim 11, further comprising a wrench having a handle portion and a notched end portion, the notched end portion being arranged and configured to be inserted into the plurality of notches in the connecting member extensions.

15. A method for attaching track switch snow melter ducts comprising the steps of:
   a) providing a pair of track switch snow melter ducts with end portions and side walls;
   b) attaching end flanges, each having a top portion and side surfaces to the end portions of each duct such that, the top portion extends radially outward from the end portion of the ducts;
   c) attaching a side flange to each side wall of each duct such that the side flange extends axially outward from the side wall forming a gap between the side flange and the end portion of the duct;
   d) attaching the end flange of one duct to the end flange of the second duct with fastening means;
   e) providing a connecting member having an elongate channel shaped portion with a base and two side legs, and extensions attached to the two side legs; and
   f) sliding the connecting member over the end flanges such that the side surfaces of the end flanges are located within the elongate channel shaped portion between the two side legs of the connecting member and the extensions are located within the gap between the end portion of the ducts and the side flanges.

16. A method for connecting track switch snow melter ducts according to claim 15, further including the step of providing connecting member extensions having a plurality of notches located therein.

17. A method for connecting track switch snow melter ducts according to claim 16, further including the step of disconnecting the track switch snow melter ducts by providing a wrench having a handle portion and a notched end portion that is arranged and configured to engage the notches in the extensions of the connecting member, engaging a pair of notches in the extensions with the notched end portion of the wrench, rotating the wrench away from the notched end portion such that the notched end portion is rotated upward, repeating the steps of engaging a pair of notches in the extensions with the notched end portion of the wrench and rotating the wrench such that the notched end portion is rotated upward until the connecting member has been removed from between the ducts, and unfastening the fastening means.

18. A method for connecting track switch snow melter ducts according to claim 15, further including the step of providing side flanges having first legs arranged and configured for attachment to the side walls of the ducts, second legs which extend radially outward from the side walls of the ducts, and third legs which extend axially outward from the side walls of the ducts, thereby forming radial gaps between the end portions of the ducts and the third legs.

19. A method for connecting track switch snow melter ducts according to claim 15, wherein the method further includes the step of affixing a gasket to one of the end flanges prior to attaching the end flanges to provide an airtight seal between the end flanges.

20. A method for connecting track switch snow melter ducts according to claim 15, further including the step of attaching adjacent end flanges by tightening a fastening means which extends through apertures located in the top portion of each end flange.

21. A method for connecting track switch snow melter ducts according to claim 15, further including the step of providing a connecting member having extension members that form generally right angles with the side legs.

* * * * *